Figure 1:
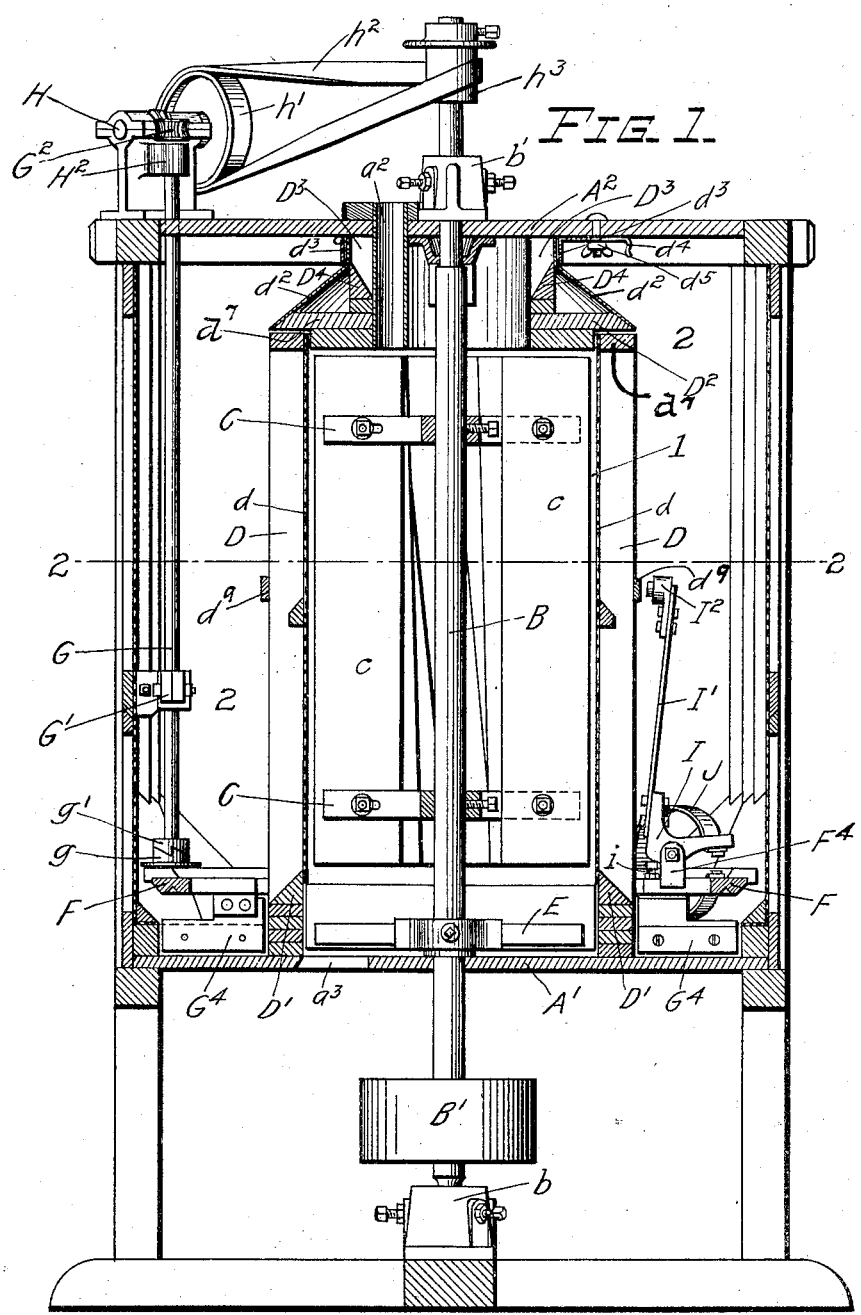

No. 789,259. PATENTED MAY 9, 1905.
J. B. CORNWALL.
GRAIN SCOURER AND SEPARATOR.
APPLICATION FILED SEPT. 7, 1904.

3 SHEETS—SHEET 1.

Witnesses
C. H. Mallinckrodt,
James P. Mansfield

Inventor
John B. Cornwall
By Alexander P. Bowell
Attorneys.

No. 789,259. PATENTED MAY 9, 1905.
J. B. CORNWALL.
GRAIN SCOURER AND SEPARATOR.
APPLICATION FILED SEPT. 7, 1904.

3 SHEETS—SHEET 2.

Witnesses
Inventor
John B. Cornwall
By Alexander Dowell
Attorneys.

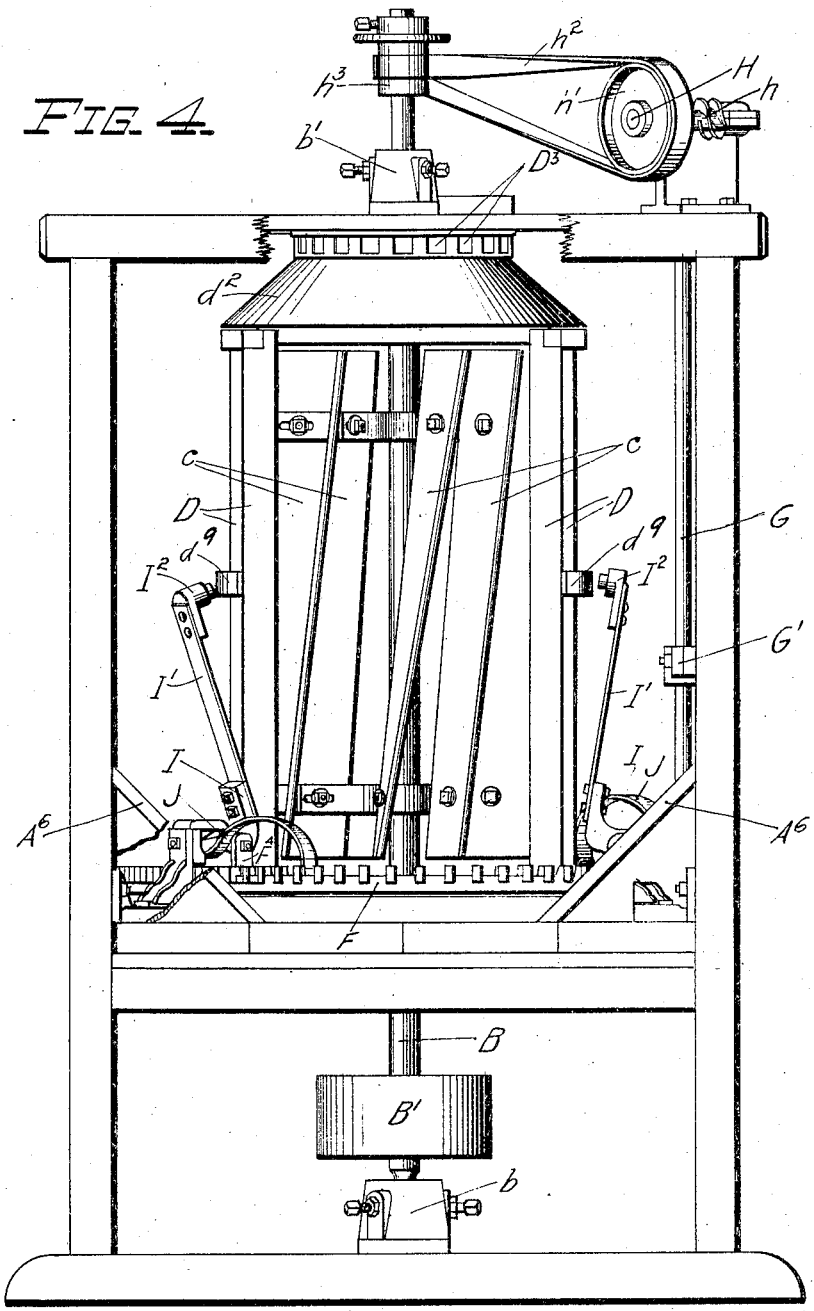

No. 789,259. Patented May 9, 1905.

UNITED STATES PATENT OFFICE.

JOHN B. CORNWALL, OF MOLINE, ILLINOIS, ASSIGNOR TO THE BARNARD AND LEAS MANUFACTURING COMPANY, OF MOLINE, ILLINOIS.

GRAIN SCOURER AND SEPARATOR.

SPECIFICATION forming part of Letters Patent No. 789,259, dated May 9, 1905.

Application filed September 7, 1904. Serial No. 223,616.

*To all whom it may concern:*

Be it known that I, JOHN B. CORNWALL, of Moline, in the county of Rock Island and State of Illinois, have invented certain new and useful Improvements in Grain Scourers and Separators; and I hereby declare that the following is a full, clear, and exact description thereof, reference being had to the accompanying drawings, which form part of this specification.

This invention is an improvement in grain scourers and separators, and is particularly designed for scouring and separating the finer from the coarser particles of ground material.

The object of the invention is to detach the finer particles of the material operated upon and separate them from the mass of material by blowing and beating the fine particles through the perforated or meshed walls of the scouring-case, within which are beaters or wings attached to a revolving shaft and which act in the double capacity of scouring-beaters and fan. These beaters force or throw the material against the sides of the surrounding scouring-case and at the same time create a strong current of air, which passes through the meshes or peforations, carrying the finer and lighter particles through the walls of the scouring-chamber into the surrounding settling-chamber, while the coarser particles remain inside the scouring-case. The air is taken from the settling-chamber through openings in the top of the scouring-case and returned from the latter into the settling-chamber, being forced through the meshed or perforated wall of the scouring-chamber in an endless current, and thus equalizing the pressure of air in both chambers. The current of air thus produced, aided by the centrifugal effect of the scouring-wings, thoroughly separates the fine from the coarse material, which is discharged at the bottom of the scouring-chamber. The inlet for air at the top of the scouring-chamber may be regulated by an annular damper, which if moved either to the right or left will close or open these openings. The walls of the scouring-chamber are preferably built in sections and bolted together and in the preferred form of machine do not revolve, as is usual in machines of this kind, but remain stationary, and in order to secure the advantages of a stationary case there is provided in the lower end of the outer chamber a toothed ring or gear, which is driven by a pinion on the shaft, which extends through the outer chamber and receives its motion from the upper end of the main or beater shaft through a worm-gear drive at the top. The lower end of the shaft is provided with a pinion, which is loosely mounted on the shaft and is driven by a clutch, the driving member of which is loosely mounted on the shaft and driven by a pin or feather on shaft, which allows the driving member to work loosely in a vertical direction, so that if the wrong motion is imparted to the shaft the driving member of the clutch will rise out of engagement, and thus prevent damage to the machine, but will descend into its proper driving position as soon as the motion is in the right direction. The toothed ring-gear is made with its teeth projecting, so that flour or fine material dropping thereon will not be compressed between the teeth, but will pass between them. This ring-gear carries scrapers, which travel within the settling-chamber around the outside of the scouring-case, collecting the fine material, which may be discharged at any point desirable. The upper side of the ring-gear is provided with lugs, to which are attached bell-crank levers, which carry jarring devices controlled by springs and operated by cams which are attached to the stationary supports of the ring-gear. The jarring devices strike against a circular band surrounding the scouring-case frame.

The accompanying drawings illustrate an efficient and preferred form of machine, which I will now describe in detail with reference to said drawings, in which—

Figure 2:
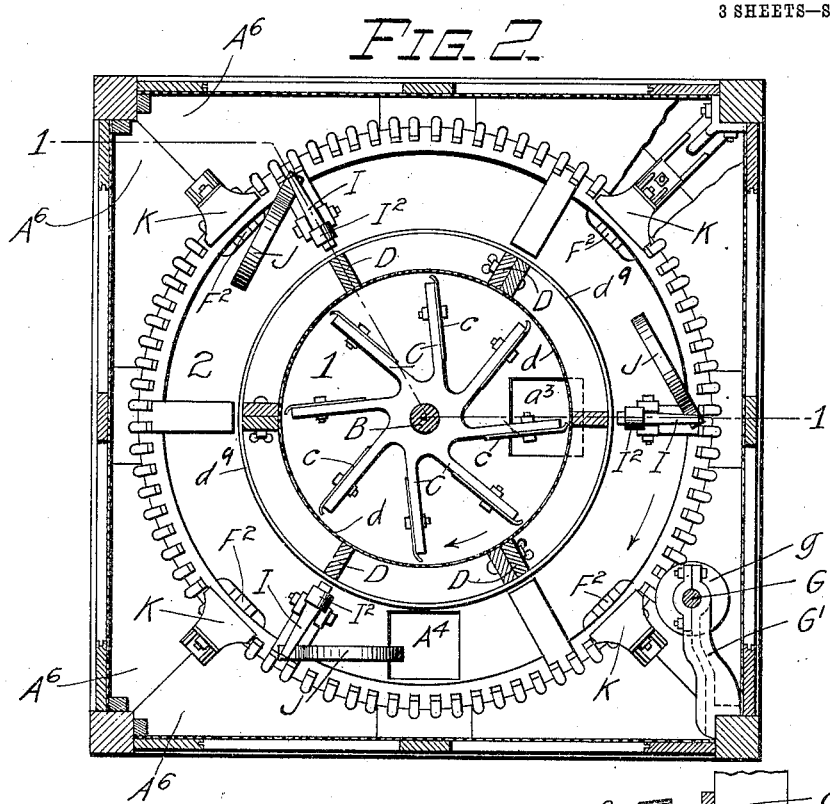
Figure 3:
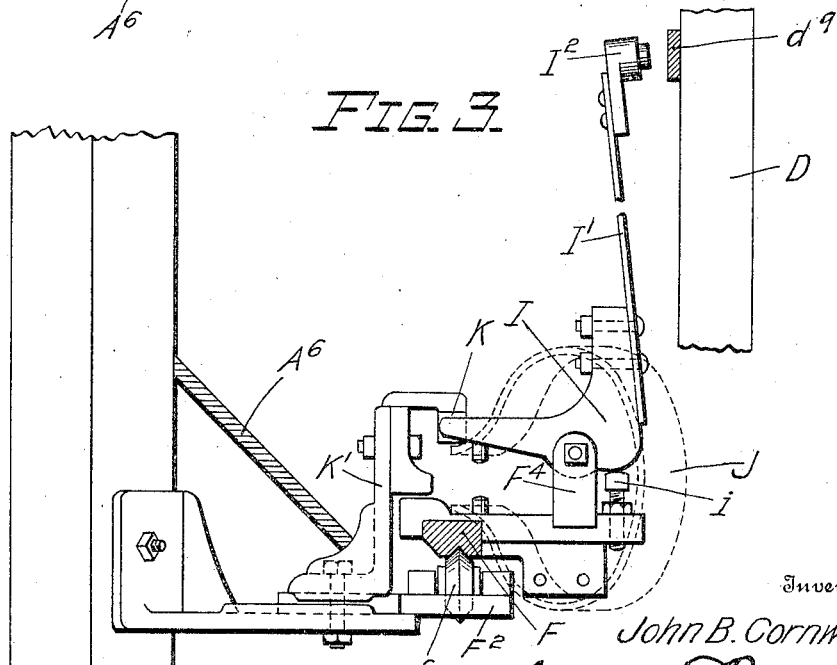

Figure 1 is a vertical sectional elevation of the complete machine on line 1 1, Fig. 2. Fig. 2 is a transverse horizontal section on line 2 2, Fig. 1. Fig. 3 is an enlarged detail showing the jarring devices. Fig. 4 is a side view of the complete machine, partly in section, with the outer walls of the screening-chamber removed.

The main frame of the machine is preferably vertical and is closed at top and bottom; but its side walls may be removable and they may be made of cloth-covered frames, if desired, the cloth being sufficiently heavy to retain the fine particles of material within the chamber. The specific construction of said frame and casing is not an essential feature of the invention. Passing centrally through said casing is a vertical shaft B, stepped in a bearing $b$ below the bottom floor of the settling-chamber and in a bearing $b'$ above the top thereof. This shaft may be driven by a pulley B' near its lower end, belted to any suitable power. On this shaft, within the main casing, are spiders C, which may have any desired number of arms, eight being shown, which arms are tangential to the shaft, and to said arms are attached blades $c$, which serve the double purpose of beaters and fans. Preferably these blades $c$ are slightly inclined or diagonal to the plane of the shaft. The series of blades rotate in an inner scouring case or chamber 1, which is built up within the outer casing or settling-chamber 2, concentric with the shaft B, and the walls $d$ thereof may be formed of fine perforated reticulated metal or cloth or other suitable material and may be supported by vertical ribs D, which are connected to an annulus D' on the bottom A' of the settling-chamber and at top are connected to the curved pieces $d^7$, which form the top of each section of the scouring-case. The top of the scouring-case is closed by an annulus $D^2$, which may be covered exteriorly by a conical metal plate $d^2$ to prevent accumulation of material thereon, and the bars D may be also connected near their centers by an annular band $d^9$ for a purpose hereinafter explained.

The annulus $D^2$ is provided with a neck $D^4$, which extends to the top $A^2$ of the casing, and has radial openings $D^3$, through which air is admitted into the scouring-chamber 1 from the exterior settling-chamber 2, which is formed by the space between the exterior walls of the casing proper and the exterior walls of the scouring-case. The openings $D^3$ are surrounded by an annular band or valve $d^3$, which may be partly rotated and can be secured by a slotted plate $d^4$ and thumb-nut $d^5$, as indicated in the drawings, said valve $d^3$ regulating the amount of air which is admitted into the scouring-chamber from the settling-chamber. The material is fed into the scouring-chamber through an opening $a^2$ in its top. Any material deposited in the scouring-chamber 1 may be ejected therefrom through an opening $a^3$ in the bottom A' into a suitable conductor or receiver, (not shown,) a spider-scraper E being attached to shaft B below the beaters $c$ and within the scouring-case, as shown.

Surrounding the annulus D is a large annular or ring gear F, which may be supported and guided on rollers $f$, attached to brackets $F^2$, secured within the settling-chamber, as shown. The teeth of this gear F are preferably projected outwardly and upwardly from the outer edge thereof, as indicated in the drawings, and mesh with a small pinion $g$, loosely journaled on the lower end of a vertical shaft G, which is journaled in a bracket G' within the casing and in a bracket $H^2$ on the top $A^2$ and has a small worm-gear $G^2$ on its upper end meshing with a worm $h$ on a stub-shaft H, attached to the bracket $H^2$. The shaft H may be driven by a pulley $h'$ and belt $h^2$ from a pulley $h^3$ on the upper end of the shaft B, as indicated in the drawings. In this way the desired relatively slow movement of the ring-gear F as compared with the beaters may be obtained. I do not, however, restrict myself to the particular drive shown in the drawings for this purpose.

The pinion $g$ is connected to the shaft G by a clutch $g'$, the upper member of which is splined to the shaft, so that if the latter should be rotated in the wrong direction the clutch member can rise and will not operate the pinion $g$, and consequently the gear F can only be driven in the proper direction.

On the upper side of the gear F are lugs $G^4$, to which are pivoted bell-crank levers I, to the vertical arms of which are attached spring-rods I', carrying hammers or tappets $I^2$ on their upper ends, which are adapted to impact against the band $d^9$ and jar the walls of the scouring-case. The hammers $I^2$ are normally held in close relation to the band $d^9$ by means of springs interposed between the horizontal arms of the levers I and the gear. As shown, an expansive C-spring J is employed for each lever, one end bearing on the gear and the other end pressing upwardly against the horizontal arm of the lever I, as shown.

The normal position of each hammer $I^2$ is regulated by an adjustable screw $i$ on the ring-gear beneath the elbow of the lever, as shown in the drawings. At intervals around the gear and scouring-casing and in the path of the horizontal arms of the levers I are located cams K, which may be adjustably supported by brackets K', secured within the settling-chamber, as shown, and as the levers I are moved with the gear F the horizontal arms of the levers are brought into contact with the stationary cams K and depressed thereby as the levers travel therepast, thus tensioning the spring J, which as soon as the lever is freed from the cam rocks the lever violently and causes the hammer to strike the band $d^9$ and jar the walls of the scouring-case, the momentum of the hammer causing it to contact the said band, as described, although the spring-arm I' will prevent its remaining in contact with the band $d^3$, and thus sharp quick jarring blows are given the walls of the scouring-case at regular intervals, the frequency of the jars being determined by the number of hammers and their actuating-cams employed, as well as by the speed of the gear F. The force of the blows may be regulated by the adjusting-screws $i$.

The outer casing or settling-chamber in the construction shown is square in cross-section, and therefore to facilitate the removal of the fine material deposited therein shunt-boards $A^6$ may be placed in the corners thereof, so that the material will be directed toward and under the gear F, and such material is ejected from the casing through an opening $A^4$, from whence it may be conducted into any suitable receiver. The material is fed to this opening $a^4$ by means of scrapers $G^4$, attached to the bottom of the gear G, as indicated in the drawings.

In the operation of the machine there should be no direct communication between the scouring-chamber and the atmosphere or the inclosing settling-chamber, except through the openings $D^3$, and there should be no direct communication between the settling-chamber and the exterior atmosphere. When the beaters are started in operation, they create a suction of air from the settling-chamber into the scouring-chamber through the openings $D^3$ and at the same time force the air from the scouring-chamber into the settling-chamber through the walls of the scouring-case. Thus a continuous circulation of air is maintained from the settling-chamber into the scouring-chamber and return. This forms an endless circuit of air, which is used over and over again. The fine particles of the ground material are carried or forced through the walls of the scouring-case by the air-blast and then deposited in said settling-chamber and discharged through opening $a^4$, as described, while the coarse particles remaining in the scouring-chamber are deposited therein and removed through the opening $a^3$. As the cubical area of the settling-chamber is much greater than that of the scouring-chamber, the air circulation in the settling-chamber is very sluggish as compared with that in the scouring-chamber, so that the fine particles will drop in the settling-chamber in the desired manner, there being scarcely any perceptible air-current in said chamber except at the upper end thereof and adjacent to the opening $D^3$. The volume of air circulating is controllable by regulating the valve $d^3$. By this arrangement, while the desired difference in velocity of air-current is obtained in the scouring and settling chambers, the air-pressures therein are practically equalized.

As will be observed in the example shown, the walls of the scouring-chamber are kept clean by the jarring devices, although said walls are stationary, the jarring devices revolving. In other words, in the example shown the scouring-case is jarred without revolving it. I do not, however, wish to restrict myself to a stationary scouring-chamber, as many valuable features of the invention—such as the arrangement of the chambers, the circulation of the air, and the discharging devices—could be retained even if the scouring-case were movable or rotatable; but the construction shown is preferred, because I find in practice that it produces a more valuable quality of finished material with less power and wear upon the parts than machines heretofore made.

While I have shown the machine as vertical, I do not restrict myself to such position of the parts, and I further do not wish to restrict myself to the specific construction of the parts shown in the drawings, and it is obvious that the details may be varied within the scope of the invention.

Having thus described my invention, what I therefore claim as new, and desire to secure by Letters Patent thereon, is—

1. The combination of a scouring-case, with rotary beaters therein, a jarring device for said scouring-case, means for revolving said jarring device around and independently of said case whereby it may strike on different parts thereof, and means for actuating the jarring device at intervals as it rotates around the case.

2. The combination of a scouring-case, rotary beaters therein, a jarring device for said scouring-case, means for rotating said jarring device around and independently of the said case whereby it may strike on different parts thereof, and for actuating it at intervals during its orbital movement around the case; with a settling-chamber surrounding the scouring-case and inclosing the jarring device, and an air-opening between the settling-chamber and scouring-chamber, substantially as described.

3. The combination of a stationary scouring-case, rotary beaters therein, a series of movable jarring devices, means for rotating said jarring devices bodily around said case so they may successively jar different parts of the case, and means for intermittently operating them during their revolution, all substantially as described.

4. In combination, a scouring-case, beaters therein, a settling-chamber surrounding said case, a rotatable gear in said settling-chamber surrounding the case, oscillating levers pivoted on said gear, jarring-hammers attached to said levers, stationary cams adapted to engage said levers as they are moved around the case, and springs for actuating said levers when released by the cam.

5. A vertical stationary walled scouring-case, a rotary fan or beater therein and means for removing the material deposited therein, in combination with a settling-chamber inclosing said scouring-case, an air-passage leading from said settling-chamber into the scouring-case, a valve controlling said passage, a gear of larger diameter than the scouring-case and within the settling-chamber, means for driving the gear, levers pivoted on the gear, spring-arms attached to said levers carrying hammers adapted to strike the case, springs for operating said levers to actuate the hammers, and cams for compressing the springs and releasing them at intervals, substantially as described.

6. The combination of a vertical scouring-case, a rotary fan or beater therein, a settling-chamber inclosing said scouring-case, air-passages leading from the settling-chamber into the scouring-case, a valve controlling said passages, a gear within the settling-chamber surrounding the lower end of the scouring-case, means for driving said gear, scrapers carried by said gear for removing material deposited in said settling-chamber, jarring devices comprising levers pivoted on the gear, spring-arms attached to said levers carrying hammers adapted to strike the case, springs for operating said levers to actuate the hammers, and stationary cams for compressing the springs and releasing them at intervals, all substantially as and for the purpose described.

7. The combination of the scouring-chamber, an annular gear around the scouring-chamber, jarring devices attached to said gear and moved thereby around the scouring-chamber, a beater within the scouring-chamber, a shaft exterior to the case, a pinion loosely mounted on said shaft and meshing with said gear, a clutch member splined on said shaft engaging said pinion, and means for operating said shaft from the beater-shaft.

8. The combination of the scouring-chamber, a settling-chamber surrounding the scouring-chamber, an annular gear in the settling-chamber around the scouring-chamber, jarring devices attached to said gear and moved thereby around the scouring-chamber, a beater within the scouring-chamber, a shaft in the settling-chamber, a pinion loosely mounted on said shaft meshing with said gear, a clutch member splined on said shaft engaging said pinion, and means for operating said shaft from the beater-shaft.

9. The combination in a grain scourer and separator, of a vertically-disposed scouring-case, a rotary beater therein, a settling-chamber inclosing said scouring-case, an air-opening leading from the settling-chamber into the scouring-chamber, a controlling-valve therefor, a rotating gear within the settling-chamber surrounding the lower end of the scouring-case, scrapers carried by said gear for removing material deposited in the settling-chamber, traveling jarring devices mounted on said gear and means for actuating the same, substantially as described.

In testimony that I claim the foregoing as my own I affix my signature in presence of two witnesses.

JOHN B. CORNWALL.

In presence of—
STEPHEN D. RAY,
C. D. NEWAL.